(12) United States Patent
Ettlinger

(10) Patent No.: US 9,121,780 B2
(45) Date of Patent: Sep. 1, 2015

(54) APPARATUS FOR TESTING RELEASE FUNCTIONALITY OF A SNOW-SKI BINDING AND A HAND TOOL EACH HAVING AN AXIAL-FORCE INDICATOR

(71) Applicant: Vermont Ski Safety Equipment, Inc., Underhill Center, VT (US)

(72) Inventor: Carl F. Ettlinger, Underhill Center, VT (US)

(73) Assignee: Vermont Ski Safety Equipment, Inc., Underhill Center, VT (US)

( * ) Notice: Subject to any disclaimer, the term of this patent is extended or adjusted under 35 U.S.C. 154(b) by 0 days.

(21) Appl. No.: 14/211,581

(22) Filed: Mar. 14, 2014

(65) Prior Publication Data

US 2014/0260655 A1    Sep. 18, 2014

Related U.S. Application Data

(60) Provisional application No. 61/792,809, filed on Mar. 15, 2013.

(51) Int. Cl.
| | |
|---|---|
| *G01N 3/08* | (2006.01) |
| *G01N 3/00* | (2006.01) |
| *G01L 5/03* | (2006.01) |

(52) U.S. Cl.
CPC .................................... *G01L 5/03* (2013.01)

(58) Field of Classification Search
CPC .... G01N 3/08; G01N 3/00; G01N 2208/0071

USPC ............... 73/788; 74/502, 519, 536, 538, 543
See application file for complete search history.

(56) References Cited

U.S. PATENT DOCUMENTS

| | | | | |
|---|---|---|---|---|
| 3,572,105 | A | * | 3/1971 | Kaehler ...................... 73/862.02 |
| 3,739,631 | A | * | 6/1973 | Clifford et al. ............ 73/862.02 |
| 3,805,603 | A | | 4/1974 | Ettlinger |
| 4,570,124 | A | * | 2/1986 | Fuchs .......................... 324/401 |

* cited by examiner

*Primary Examiner* — Lisa Caputo
*Assistant Examiner* — Nathaniel T Woodward
(74) *Attorney, Agent, or Firm* — Downs Rachlin Martin PLLC

(57) ABSTRACT

A ski-binding testing apparatus that includes an axial-force indicator that indicates when a force applied to the testing apparatus has an axial component that is outside of an acceptable range. In one example, the apparatus includes a simulated foot, a force-transmitting structure coupled to the simulated foot, a handgrip coupled to the force-transmitting structure, and an axial-force indicator that indicates when a forced applied by a user to the handgrip exceeds a predetermined threshold. In one embodiment, the force-transmitting structure can include a torque wrench that includes a torque beam, the handgrip, and axial-force indicator. The torque wrench can be provided with a conventional work-engagement end, such as a socket-type receiver to allow the axial-force-indicating functionality to be used outside the context of a ski-binding testing apparatus.

20 Claims, 3 Drawing Sheets

APPARATUS FOR TESTING RELEASE FUNCTIONALITY OF A SNOW-SKI BINDING AND A HAND TOOL EACH HAVING AN AXIAL-FORCE INDICATOR

RELATED APPLICATION DATA

This application claims the benefit of priority of U.S. Provisional Patent Application Ser. No. 61/792,809, filed on Mar. 15, 2013, and titled "A Device to Improve The Performance of Manually Operated Snow Ski Binding Testers," which is incorporated by reference herein in its entirety.

FIELD OF THE INVENTION

The present invention generally relates to the field of snow ski equipment testing. In particular, the present invention is directed to an apparatus for testing release functionality of a snow-ski binding and a hand tool each having an axial-force indicator.

BACKGROUND

Releasable alpine ski bindings are routinely tested for proper release functionality using a device that meets American Society for Testing and Materials (ASTM) International Standards F1061 and F1062. Alpine ski bindings generally release in two modes, twist and forward lean, and release requirements for these modes are describe, respectively, in ASTM Standards F1063 and F1064. Examples of existing manually operated testing devices are described in U.S. Pat. No. 3,805,603 titled "DEVICE FOR MEASURING FORWARD BEND RESISTANCE OF SKI BINDINGS" and issued to Ettlinger on Apr. 23, 1974, and U.S. Pat. No. 3,192,767 titled "TORQUE MEASURING DEVICE FOR DETERMINING THE SAFETY OF SKI FOOT FASTENINGS" and issued to Outwater on Jul. 6, 1965.

SUMMARY OF THE DISCLOSURE

In one implementation, the present disclosure is directed to an apparatus for testing a release functionality of a ski binding. The apparatus includes a simulated foot designed and configured to be at least one of 1) inserted into a ski boot that in turn is engageable to the ski binding and 2) installed directly into the ski binding; a force-transmitting structure coupled to the simulated foot and having a force-applying region spaced from the simulated foot, wherein the force-transmitting structure is designed and configured to impart movement into the simulated foot when a testing force is applied at the force-applying region; a handgrip coupled to the force-transmitting structure, the handgrip designed and configured to transmit an applied force, applied by a user gripping the handgrip, to the force-applying region, wherein the applied force has a substantially pure axial component relative to the force-transmitting structure; an axial-force indicator designed and configured to indicate to the user when the substantially pure axial component of the applied force exceeds a predetermined magnitude.

In another implementation, the present disclosure is directed to a hand tool, which includes a torque beam having a work-engagement end; a handgrip support extending from the torque beam and having a force-applying region spaced from the work-engagement end; a handgrip coupled to the handgrip support, the handgrip designed and configured to transmit an applied force, applied by a user gripping the handgrip, to the force-applying region, the applied force having pure axial component and a pure-bending component relative to the torque beam; and an axial-force indicator designed and configured to indicate to the user when the pure axial component of the applied force exceeds a predetermined magnitude.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
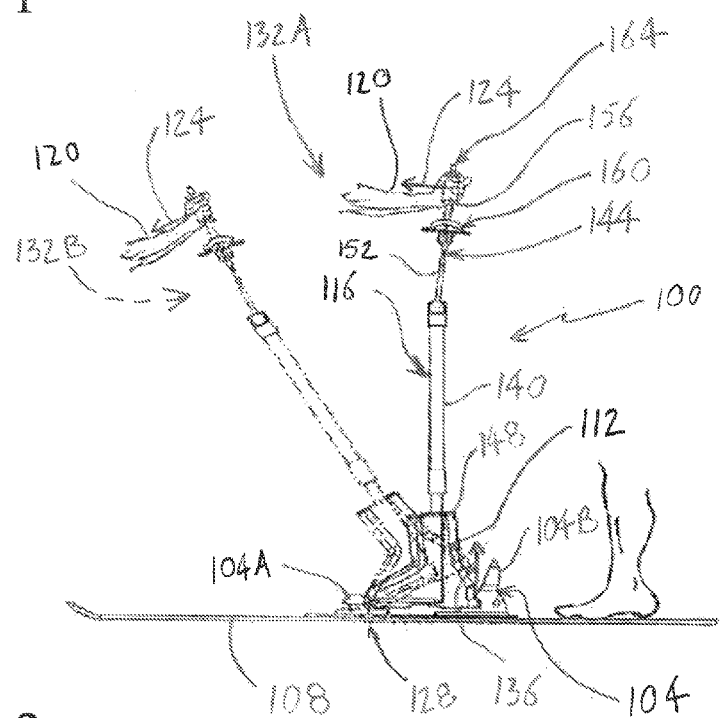
FIG. 1 is a side-elevational view of a testing scenario in which the forward-bending release functionality of an alpine ski biding is being tested using a testing apparatus of the present invention.

The present inventor has discovered that with certain conventional apparatuses for testing release functionality of snow-ski bindings, operators manually applying test loads to the apparatuses can apply unintended and undesirable loads that skew the test results. For example, relative to the forward bending testing apparatus shown in U.S. Pat. No. 3,805,603 titled "DEVICE FOR MEASURING FORWARD BEND RESISTANCE OF SKI BINDINGS" and issued to Ettlinger on Apr. 23, 1974 (hereinafter, "the '603 patent"), an operator engaging torque wrench 21 (FIG. 4 of the '603 patent) with aperture 19 of the testing device (see FIGS. 1 and 1a of the '603 patent) to perform a forward-bending release test can inadvertently induce an undesirable substantially pure axial force component into lever arm 9 . To illustrate, when torque wrench 21 of the '603 patent is envisioned engaged with aperture 19 of the testing device so that grip 30 of the wrench is located distally relative to sole plate 6 (generally in the manner of torque wrench 144 of FIG. 1 of the present disclosure) taller operators grasping grip 30 (FIG. 4 of the '603 patent) can readily end up pulling upward on the grip (instead of just pulling in a direction perpendicular to the longitudinal axis of the torque beam of the wrench), thereby inducing a substantially pure tensile force into the torque beam of the wrench and, consequently, inducing a substantially pure axial tensile force component into lever arm 9. Conversely, shorter operators grasping grip 30 can readily end up pushing downward on the grip (again, instead of just pulling in a direction perpendicular to the longitudinal axis of the torque beam of wrench 21), thereby inducing a substantially pure compressive force into the torque beam of the wrench and, consequently, inducing a substantially pure axial compressive force component into lever arm 9. It is noted that the term "substantially" is used above to indicate that the longitudinal axes of the torque beam of wrench 21 and lever arm 9 may not be perfectly coaxial, such that the axial load component in the torque beam does not induce exactly a pure axial stress in the torque beam. As those skilled in the art can readily appreciate, these unwanted axial load components are largely unaccounted for in the torque readings from torque wrench 21 and cause the release-force test results to contain error.

In view of the present inventor's identification of operator error in performing forward-bending-release testing and the resulting error in the test results, the present inventor has devised ways to provide feedback to an operator that allows the operator to adjust his/her manual application of force to a ski-binding-release-testing apparatus to avoid inducing unwanted (substantially) pure axial load components into the apparatus. In this connection, FIG. 1 of the present disclosure illustrates a forward-bending-release-testing scenario that utilizes a testing apparatus 100 to test the forward-bending-release functionality of a snow-ski binding 104, here an alpine ski binding having a toepiece 104A and a heelpiece 104B mounted to a snow-ski 108. Testing apparatus 100 includes a simulated foot 112 and a lever arm 116 to which an operator 120 applies a force 124 that causes the simulated foot to pivot about a toe-pivot point 128, such as from position 132A to position 132B so as to cause an uplift force 136 on heelpiece 104B. In the example shown, lever arm 116 includes a force-transmitting structure 140, which in this case is a leg extension coupled to simulated foot 112, and a torque wrench 144 that is removable engageable with the leg extension, such as in the manner described in the '603 patent noted above. The '603 patent is incorporated herein by reference for all of its teachings of forward-bending testing and configurations of forward-bending-testing devices. It is note that while lever arm 116 is shown as comprising two separable components, alternative embodiments can have a unitary monolithic lever arm. In addition, it is noted that while the testing scenario illustrated in FIG. 1 utilizes a simulate foot 112 that engages a ski boot 148, in other embodiments the simulated foot may engage binding 104 directly in the manner that a ski boot would. In the embodiment shown, torque wrench 144 includes a torque beam 152, a handgrip 156 coupled to the torque beam, a torque-measuring system 160, and an axial-load indicator 164. As described below in detail, axial-load indicator indicates to operator 120 when the force the operator is applying via handgrip 156 is causing an undesirable amount of (substantially) purely axial load into lever arm 116.

Figure 2:
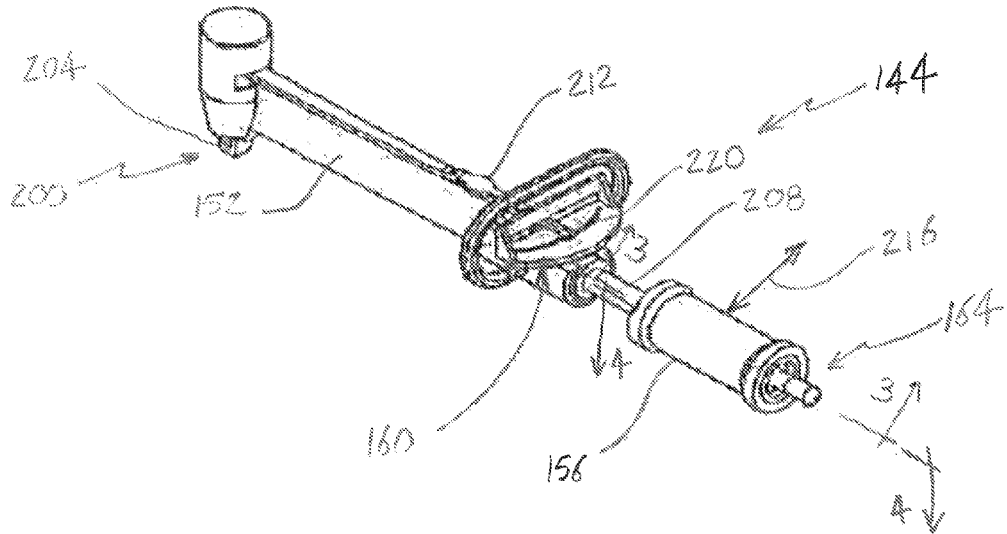
FIG. 2 is an enlarged isometric view of the hand tool of the testing apparatus of FIG. 1.

FIG. 2 shows components of torque wrench 144 in more detail than FIG. 1. As seen in FIG. 2, in addition to torque beam 152, handgrip 156, torque-measuring system 160, and axial-load indicator 164, torque wrench 144 includes a work-engagement end 200, here including a socket-type receiver 204, and a handgrip support 208 fixedly coupled to the torque beam. FIG. 2 also shows that torque-measuring system 160 includes 1) an indicator 212 that remains fixed relative to work-engagement end 200 as torque beam 152 bends upon application of a force 216 to handgrip 156 and 2) a torque scale 220 that moves generally circumferentially relative to the indicator as the torque beam bends upon application of the force to the handgrip.

Figure 3:
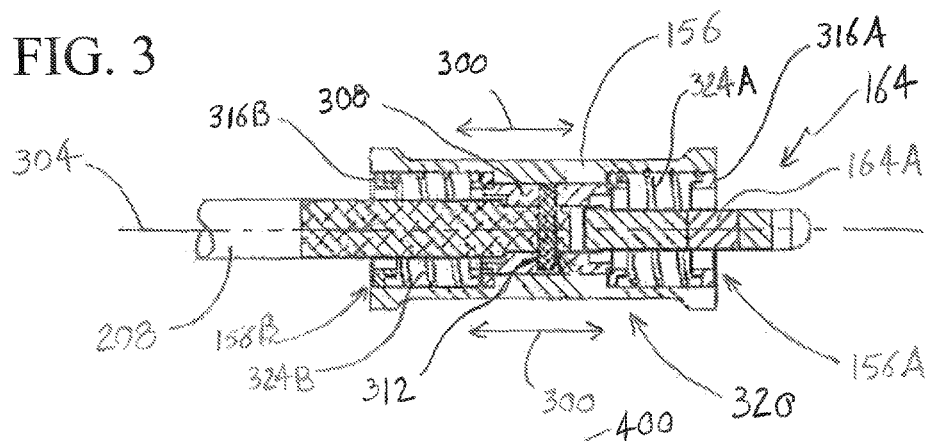
FIG. 3 is an enlarged partial cross-sectional view as taken along line 3-3 of FIG. 2.

FIG. 3 shows details of the coupling of handgrip 156 to handgrip support 208 that allow axial-load indicator 164 to provide feedback to operator 120 (FIG. 1) when using torque wrench 144 (FIGS. 1 and 2), such as in conjunction with testing forward-lean-release functionality of binding 104 (FIG. 1). As seen in FIG. 3, handgrip 156 is translationally movable relative to handgrip support 208 as indicated by arrows 300 so as to be movable along longitudinal axis 304 of the handgrip support. This translational movement of handgrip 156 works in conjunction with axial-load indicator 164 to provide feedback to operator 120 on whether or not any axial load the operator is imparting into handgrip support along longitudinal axis 304 is within a predetermined acceptable magnitude. This feedback is described below in detail in conjunction with FIGS. 5A through 7B.

Figure 4:
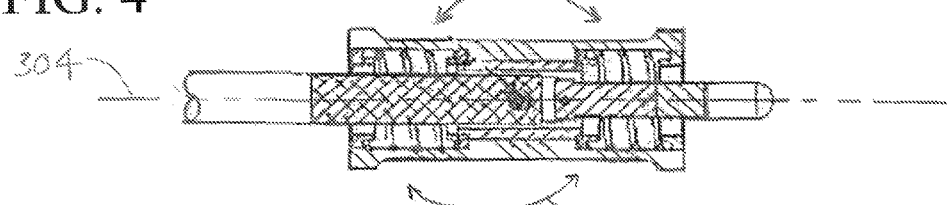
FIG. 4 is an enlarged partial cross-sectional view as taken along line 4-4 of FIG. 2.

Continuing with FIG. 3, however, handgrip 156 is coupled to handgrip support 208 by an arrangement that allows the handgrip to both pivot and move translationally relative to longitudinal axis 304. In the embodiment shown, the arrangement includes an inner sleeve 308 that is secured to handgrip support 208 via a pivot pin 312 that allows handgrip 156 to pivot in a manner that allows the user to ensure that the load he/she is applying is applied to the handgrip support at the location necessary, i.e., at the location of the pivot pin, to make the torque readings provided by torque scale 220 (FIG. 2) accurate. Arrows 400 of FIG. 4 illustrates the pivoting action of handgrip 156. Those skilled in the art will be very familiar with the purpose behind pivot pin 312 and the functionality of the pivoting action of handgrip 156.

Referring again to FIG. 3, handgrip 156 is slidably engaged with inner sleeve 308 to allows the handgrip to slide on the inner sleeve as indicated by arrows 300. In the embodiment shown, a pair of end caps 316A and 316B are fixed to handgrip 156, and the handgrip is biased into a neutral position 320 by a biasing arrangement, here a pair of coil springs 324A and 324B that work against the corresponding respective end caps and inner sleeve 308. As described below in more detail relative to FIGS. 5A to 7B, the biasing of coil springs 324A and 324B locates distal end 156A of handgrip 156 so that it is ideally centered in an acceptable gauge-region 164A of axial-load indicator 164. Those skilled in the art will readily appreciate that while a pair of coil springs 324A and 324B are shown as the biasing arrangement that biases handgrip 156 to neutral position 320 and thereby centering distal end 156A relative to acceptable gauge-region 164A of axial-load indicator 164, other biasing arrangements can be used, such as, a single coil spring and one or more elastomeric bodies, bands, etc., among others. Fundamentally, there is not limitation on the form of the biasing arrangement as long as it provides the requisite functionality.

Figures 5A, 5B:
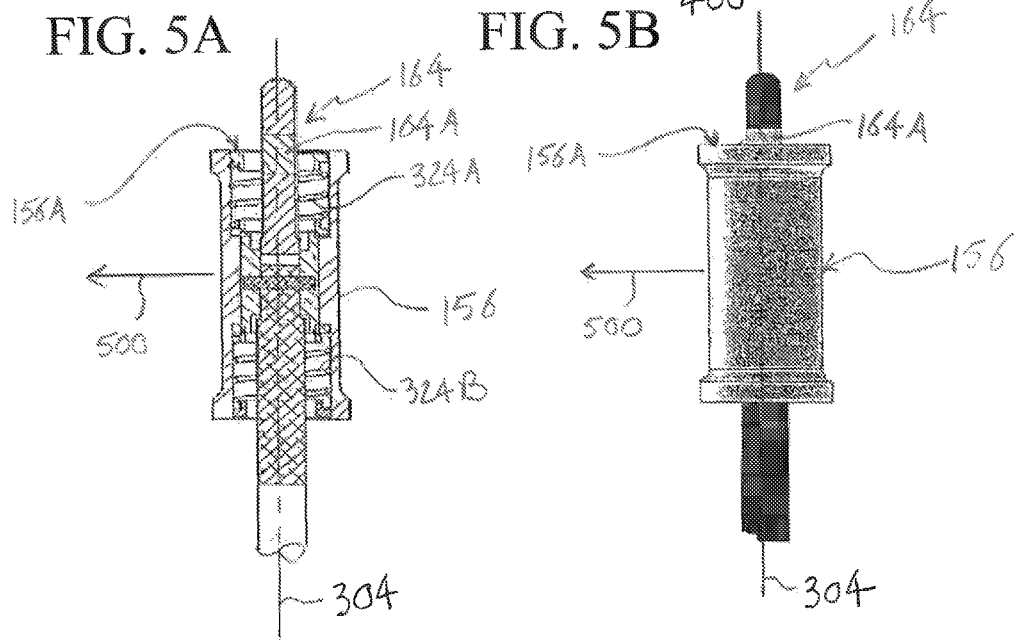
FIG. 5A is an enlarged elevational view of the handgrip region of the hand tool of FIG. 2 showing the axial-force indicator registering that an acceptable amount of axial force is being applied to the torque beam of the hand tool.
FIG. 5B is a longitudinal cross-sectional view of the handgrip region of FIG. 5A.

Referring now to FIGS. 5A and 5B, these figures shown distal end 156A of handgrip 156 as registering relative to axial-load indicator 164 that the user (not shown) is applying a load 500 to handgrip 156 that has an axial component, or here a lack thereof, relative to longitudinal axis 304 of handgrip support 208 that is within the acceptable gauge-region 164A of the axial-load indicator. In this position, neither of coil springs 324A and 324B is compressed or relaxed beyond the compression/relaxation they have when in neutral position 320 of FIG. 3.

Figure 6A:
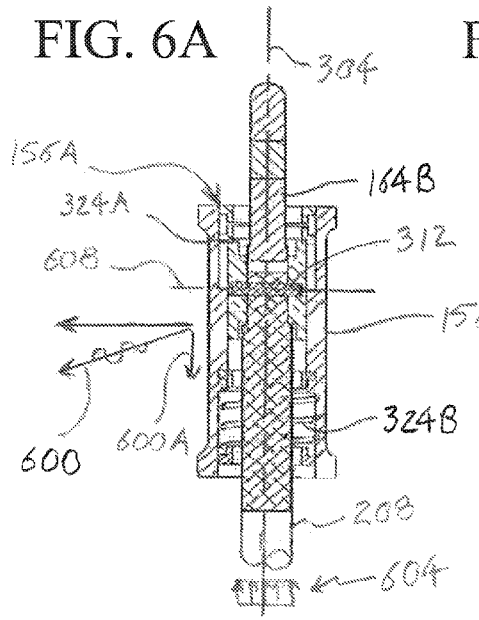
FIG. 6A is an enlarged elevational view of the handgrip region of the hand tool of FIG. 2 showing the axial-force indicator registering that an unacceptable amount of compressive axial force is being applied to the torque beam of the hand tool.
Figure 6B:
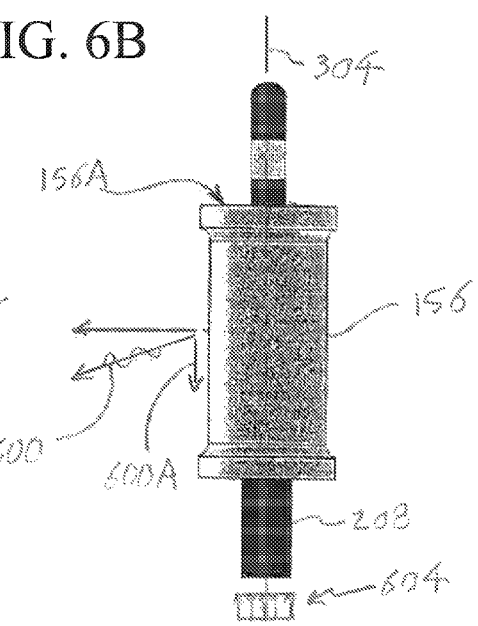
FIG. 6B is a longitudinal cross-sectional view of the handgrip region of FIG. 6A.

FIGS. 6A and 6B, on the other hand, illustrate a situation in which the user (not shown) is applying a load 600 having an axial component 600A that is outside of the acceptable limits for the testing at issue. In this case, axial component 600A is inducing a substantially pure axial compressive stress 604 into handgrip support 208. It is noted that the word "substantially" is used here to account for the fact that handgrip 156 may be pivoted slightly, by virtue of the pivotability about the longitudinal axis 608 of pivot pin 312. As can be seen in FIGS. 6A and 6B, distal end 156A of handgrip 156 is registering in an unacceptable-axial-compression gauge-region 164B of axial-load indicator 164. Those skilled in the art will readily appreciate that the magnitude of compressive axial component 600A that is deemed unacceptable is dependent on the application of torque wrench 144. In this connection, those skilled in the art will understand that the bias rate of the biasing arrangement utilized, here the spring rate of coil spring 324A (or the spring rates of both coil springs 324A and 324B), and the length of travel of handgrip 156 relative to handgrip support 208 and, correspondingly, the location of the transition between acceptable gauge-region 164A and unacceptable gauge-region 164B of axial-load indicator 164 can all be used to calibrate the axial-load indicator so that it registers when the magnitude of compressive axial component 600A becomes unacceptable.

Figure 7A:
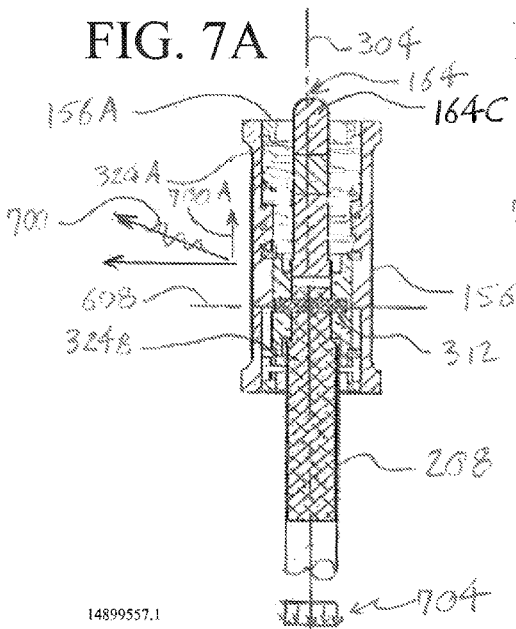
FIG. 7A is an enlarged elevational view of the handgrip region of the hand tool of FIG. 2 showing the axial-force indicator registering that an unacceptable amount of tensile axial force is being applied to the torque beam of the hand tool.
Figure 7B:
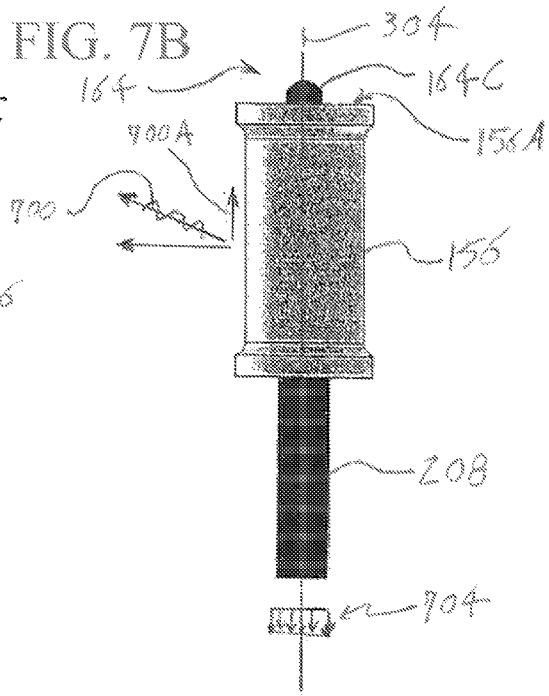
FIG. 7B is a longitudinal cross-sectional view of the handgrip region of FIG. 7A.

Similarly, FIGS. 7A and 7B illustrate a situation in which the user (not shown) is applying a load 700 having a tensile axial component 700A that is outside of the acceptable limits for the testing at issue and is inducing a substantially pure axial tensile stress 704 into handgrip support 208. Again, the word "substantially" is used here to account for the fact that handgrip 156 may be pivoted slightly, by virtue of the pivotability about the longitudinal axis 604 of pivot pin 312. As can be seen in FIGS. 7A and 7B, distal end 156A of handgrip 156 is registering in an unacceptable-axial-tension gauge-region 164C of axial-load indicator 164. Those skilled in the art will readily appreciate that the magnitude of tensile axial component 700A that is deemed unacceptable is dependent on the application of torque wrench 144. In this connection, those skilled in the art will understand that the bias rate of the biasing arrangement utilized, here the spring rate of coil spring 324B (or the spring rates of both coil springs 324B and 324A), and the length of travel of handgrip 156 relative to handgrip support 208 and, correspondingly, the location of the transition between acceptable gauge-region 164A and unacceptable gauge-region 164C of axial-load indicator 164 can all be used to calibrate the axial-load indicator so that it registers when the magnitude of tensile component 700A becomes unacceptable.

It is noted that in the foregoing example axial-load indicator 164 is located so that distal end 156A of handgrip 156 registers against gauge-regions 164A to 164C of the axial-load indicator. However, in other embodiments, the axial-load can be located elsewhere, such as "below" the handgrip so that the proximal end 156B (FIG. 3) of the handgrip registers against the axial-load indicator. In still other embodiments, the axial load indicator may be located remotely from the handgrip altogether. In such embodiments, the handgrip may be provided with an extension member that moves with the handgrip and has a registration region that registers against the gauge-regions as the handgrip moves. A number of additional embodiment are described below to illustrate the wide variety of axial-load indicator arrangements and handgrip locations that are possible.

It is further noted that axial-load indicator 164 illustrated is a visual indicator. As such, gauge-regions 164A to 164C may be provided with any suitable indicia indicating the meaning of that region. For example, acceptable-axial-load gauge-region 164A may be colored green while both of unacceptable-axial-load gauge-regions 164B and 164C may be colored red. Alternatively or in addition, one or more other visual indicia, such as words (e.g., "PASS" and "FAIL" or the like) and/or symbols may be used. In addition, or alternatively, the visual indicator can be one or more lights and/or an electronic display. As those skilled in the art will readily understand, such electronic versions can include one or more switches actuated by movement of handgrip 156 and/or one or more load sensors that sense the magnitude and/or direction of the axial component of the load a user applies to the handgrip. Alternatively or in addition to embodying the axial-load indicator to provide visual feedback, the axial-load indicator may include another type of sensory feedback, such as aural feedback or haptic feedback or any combination thereof. Again, those skilled in the art will understand how to implement an axial-load indicator of the present disclosure in any one of many differing forms.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for testing a release functionality of a ski binding, the apparatus comprising:
   a simulated foot designed and configured to be at least one of 1) inserted into a ski boot that in turn is engageable to the ski binding and 2) installed directly into the ski binding;
   a force-transmitting structure coupled to said simulated foot and having a force-applying region spaced from said simulated foot, wherein said force-transmitting structure is designed and configured to impart movement into said simulated foot when a testing force is applied at said force-applying region;
   a handgrip coupled to said force-transmitting structure, said handgrip designed and configured to transmit an applied force, applied by a user gripping said handgrip, to said force-applying region, wherein the applied force has a substantially pure axial component relative to said force-transmitting structure;
   an axial-force indicator designed and configured to indicate to the user when the substantially pure axial component of the applied force exceeds a predetermined magnitude in each of a compressive direction and a tensile direction.

2. An apparatus according to claim 1, wherein:
   said force-transmitting structure comprises a longitudinal axis in said force-applying region;
   said handgrip is moveably attached to said force-transmitting structure at said force-applying region so as to allow longitudinal movement of said handgrip in a direction parallel to said longitudinal axis; and
   said axial-force indicator comprises a visual indicator designed and configured to indicate an extent of longitudinal movement of said handgrip relative to said force-transmitting structure.

3. An apparatus according to claim 2, wherein said handgrip extends around said force-applying region.

4. An apparatus according to claim 2, wherein said axial-force indicator comprises a visual indicator that includes an acceptable-axial-force indicating gauge-region flanked by a pair of non-acceptable-axial-force indicating gauge-regions for indicating, respectively, a non-acceptable axial compressive force and a non-acceptable axial force.

5. An apparatus according to claim 4, wherein said handgrip is springingly biased so that said axial-force indicator registers in said acceptable-axial-force indicating gauge-region when a user is not applying a force to said handgrip.

6. An apparatus according to claim 5, wherein said handgrip is pivotably attached to said force-transmitting member.

7. An apparatus according to claim 4, wherein said handgrip has a distal end relative to said simulated foot, and said axial force indicator is located so as to register movement of said distal end.

8. An apparatus according to claim 1, wherein said force-transmitting structure comprises a torque beam and a leg extension, wherein said leg extension is coupled to said simulated foot and said torque beam is coupled to said leg extension, wherein:
said handgrip is attached to said torque beam; and
said axial-force indicator is located on said torque beam.

9. An apparatus according to claim 8, wherein said torque beam is removably attached to said leg extension.

10. An apparatus according to claim 1, further comprising a bending-force indicator designed and configured to indicate to the user the bending component of the testing force when the ski binding releases.

11. An apparatus according to claim 1, wherein:
the apparatus is designed and configured to test forward bending release functionality of the ski binding;
said force-transmitting structure is a lever structure; and
the testing force is a bending component of the applied force.

12. A hand tool, comprising:
a torque beam having a work-engagement end;
a handgrip support extending from said torque beam and having a force-applying region spaced from said work-engagement end;
a handgrip coupled to said handgrip support, said handgrip designed and configured to transmit an applied force, applied by a user gripping said handgrip, to the force-applying region, the applied force having pure axial component and a pure-bending component relative to said torque beam; and
an axial-force indicator designed and configured to indicate to the user when the pure axial component of the applied force exceeds a predetermined magnitude in each of a compressive direction and a tensile direction.

13. A hand tool according to claim 12, wherein:
said handgrip support comprises a longitudinal axis in said force-applying region;
said handgrip is moveably attached to said handgrip support at said force-applying region so as to allow longitudinal movement of said handgrip relative to said handgrip support in a direction parallel to said longitudinal axis; and
said axial-force indicator comprises a visual indicator designed and configured to indicate an extent of longitudinal movement of said handgrip relative to said handgrip support.

14. A hand tool according to claim 13, wherein said handgrip extends around said force-applying region.

15. A hand tool according to claim 14, further comprising a sleeve secured to said handgrip support so as to be constrained to move in a direction parallel to said longitudinal axis of the handgrip support, wherein said handgrip is springingly engaged with said sleeve so as to be movable in the direction parallel to said longitudinal axis of the handgrip support.

16. A hand tool according to claim 13, wherein said axial-force indicator comprises a visual indicator that includes an acceptable-axial-force indicating gauge-region flanked by a pair of non-acceptable-axial-force indicating gauge-regions for indicating, respectively, a non-acceptable axial compressive force and a non-acceptable axial force.

17. A hand tool according to claim 15, wherein said handgrip is springingly biased so that said axial-force indicator registers in said acceptable-axial-force indicating gauge-region when a user is not applying a force to said handgrip.

18. A hand tool according to claim 17, wherein said handgrip is pivotably attached to said torque beam.

19. A hand tool according to claim 16, wherein said handgrip has a distal end relative to said simulated foot, and said axial force indicator is located so as to register movement of said distal end.

20. A hand tool according to claim 12, wherein said work-engagement end includes a socket-type receiver.

* * * * *